United States Patent [19]

Shoji et al.

[11] Patent Number: 4,824,299
[45] Date of Patent: Apr. 25, 1989

[54] CHIP BREAKING DEVICE FOR ANNULAR CUTTERS

[75] Inventors: Michihiro Shoji; Osamu Asano, both of Tokyo, Japan

[73] Assignee: Nitto Kohki Co., Ltd., Tokyo, Japan

[21] Appl. No.: 122,122

[22] Filed: Nov. 17, 1987

[30] Foreign Application Priority Data

Sep. 24, 1987 [JP] Japan ............................... 62-145770

[51] Int. Cl.⁴ ................................................ B23C 9/00
[52] U.S. Cl. .................................... 409/137; 409/136
[58] Field of Search ................................ 409/137, 136

[56] References Cited

U.S. PATENT DOCUMENTS 4,514,120  4/1985  Hougen ................................ 409/137
4,743,148  5/1988  Wahlbeck ........................... 409/137

Primary Examiner—Léon Scott, Jr.
Attorney, Agent, or Firm—Nixon & Vanderhye

[57] ABSTRACT

A chip breaking device for annular cutters has a comb-shaped member fixed to the front wall of a boring machine. The comb-shaped member includes a stem extending in parallel with the annular cutter rotated by the boring machine and three or more elongated chip breaking elements extending perpendicularly from the stem and into proximity to the outer periphery of the annular cutter. Chips formed by the annular cutter hit against the chip breaking elements and their tip portions are caught by the elements. Then, intermediate portions pass through the spacings between the adjacent chip breaking elements. Thereafter the chips are pulled and broken into pieces.

7 Claims, 4 Drawing Sheets

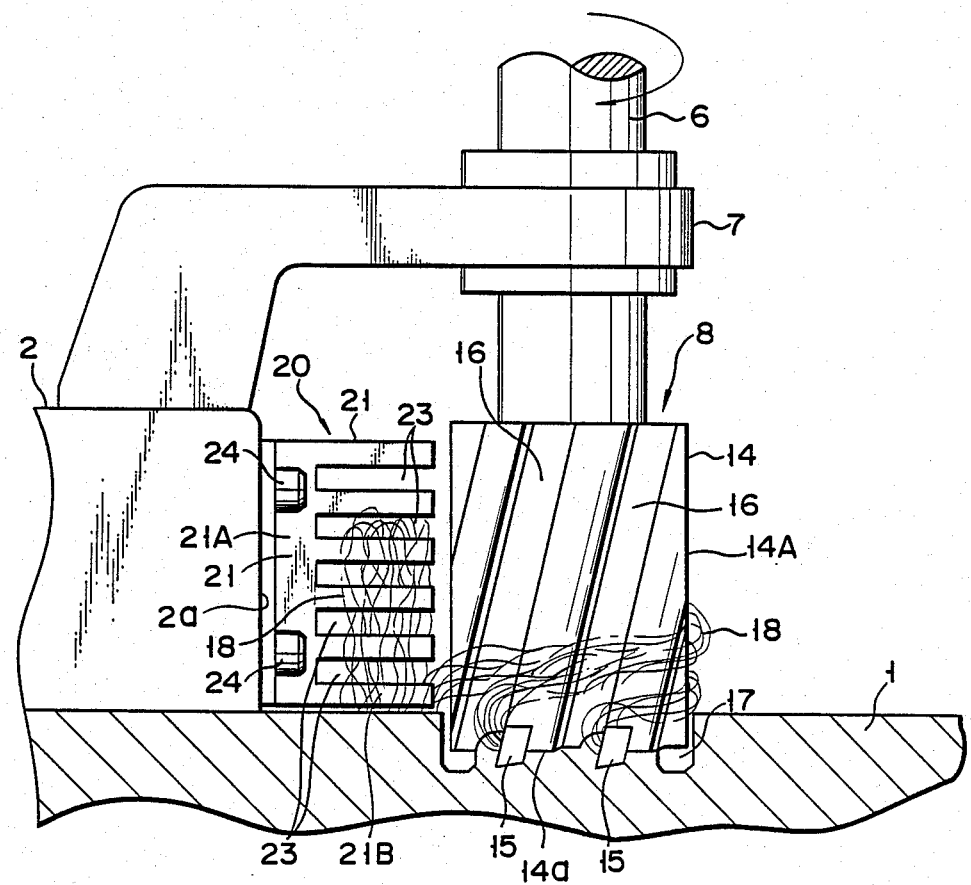
F I G. 2

CHIP BREAKING DEVICE FOR ANNULAR CUTTERS

BACKGROUND OF THE INVENTION

1. Field of the Invention

This invention relates to a chip breaking device for annular cutters with an improved chip-removing and cutting efficiency.

2. Description of the Related Art

Although a twist drill having two cutting edges can be used for a boring operation, it is more usual for an annular cutter to be employed, because it has a small driving motor and shortens the cutting time. This annular cutter has a rotatable hollow-cylindrical body provided with a plurality of cutting edges arranged in circular fashion on its lower end edge. The annular cutter cuts a narrow annular groove by means of the cutting edges, thereby to effectively form a hole where one is required.

Chips cut by the cutting edges of the annular cutter are removed from the annular groove being formed to the outside of the annular cutter via the flutes which are formed in the outer periphery of the body and are adjacent to the corresponding cutting edges. Chips being continuously pushed out of the flutes tend easily to wrap around the annular cutter, and as the annular groove is cut deeper, so the amount of the chips wound around the annular cutter becomes greater, easily clogging the flutes. This lowers the chip-removing efficiency and increases the cutting resistance. Finally, such clogging may ultimately lead to the boring operation having to be stopped. If this occurs, the stopped cutter must then be removed from the work and the chips manually removed. This troublesome and time-consuming operation inevitably leads to a lower cutting efficiency.

In order to overcome this problem, there has been proposed a chip breaker for annular cutters having a lug extending parallel with the outer periphery of the annular cutter, as described in the specification of U.S. Pat. No. 4,514,120. The lug is arranged close to the outer periphery of the annular cutter. The chips being ejected from the flutes abut against the lower end portion of the lug and are forcibly bent. Thereafter, they are scattered in the centrifugal direction.

Chips resulting from the formation of an annular groove in a work may curl outside of the flutes, may flail about irregular fashion, due to changes in the cutting conditions, and may vary slightly in their respective thickness.

When chips abut against the lug of a conventional chip breaker, they are often not broken and instead are moved upward along the cutter, while remaining wrapped therearound. Once they begin to wind themselves around the cutter, the amount of the chips wrapped therearound increases rapidly, greatly reducing the chip-removing efficiency. If chips become very tightly wound around the annular cutter, the boring operation must then be interrupted or else the chips must be removed from the cutter before the next boring operation begins. Not only is this a time-consuming process; there is a strong possibility of injury to the operator, through his fingers, for example, being badly cut by a sharp chip.

SUMMARY OF THE INVENTION

The object of this invention is to provide a chip breaking device, for use with annular cutters, which prevents chips from wrapping tightly around the annular cutter and thereby improves the chip-removing efficiency.

In order to achieve this object, there is provided a chip breaking device for annular cutters which comprises a stem extending parallel with the outer periphery of the hollow cylindrical body of an annular cutter, and at least three elongated chip breaking elements which extend perpendicularly from the stem into proximity to the outer periphery of the cylindrical body of the cutter and are spaced from each other in the axial direction thereof.

As the boring operation proceeds, chips being removed from flutes of the cutter are subjected to a centrifugal force and expand outward. First, part of the chips abuts against the chip breaking elements and becomes tangled thereon. Since the cutter rotates at a high speed, the chips are pulled and broken into short lengths. Continuous chips are therefore not produced which would likely wrap tightly—either singly or in layers—around the outer periphery of the annular cutter and clog the flutes thereof.

BRIEF DESCRIPTION OF THE DRAWINGS

This invention can be fully understood from the following detailed description, with reference to the accompanying drawings in which:

FIG. 2 is a front view of one embodiment of the chip breaking device according to this invention;

DESCRIPTION OF THE PREFERRED EMBODIMENTS

Figure 1:
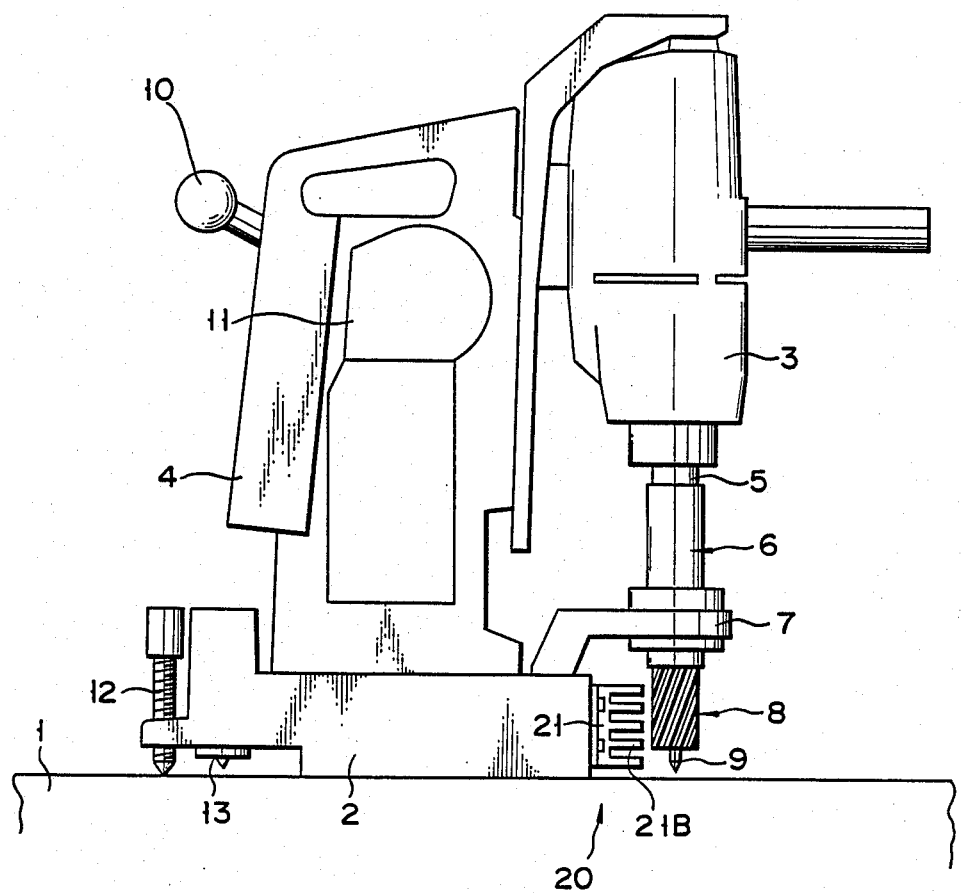
FIG. 1 is a lateral elevational view of a boring machine provided with a chip breaking device of this invention.

Referring to FIG. 1, a boring machine includes frame 4 on the lower end of which is electromagnetically attracting base 2. Base 2 is electromagnetically fixed onto magnetic work 1, at a required position. Vertically movable electric drill 3 is located on an upper front portion of frame 4, and cutter arbor 6 is fixedly and concentrically held in spindle 5 of electric drill 3. The central portion of cutter arbor 6 is supported by holder 7 projecting from the front portion of base 2. Annular cutter 8 is fixedly held in the lower end portion of cutter arbor 6. Pilot pin 9 is located coaxially in cutter arbor 6 and is elastically urged downward so as to project from or retract into the lower end of cutter 8. Pilot pin 9 also acts as a center of cutter 8 and a pin for rejecting slag.

Electric drill 3 is raised or lowered manually by handle 10 on frame 4 or else automatically by driving automatic feeding unit 11 comprising, for example, a motor and a reduction mechanism such as a harmonic drive mechanism. Upright stabilizer or stop 12 is screwed to the rear portion of frame 4, so that the front portion of base 2 is prevented from lifting due to the reaction produced when cutter 8 cuts work 1 while electric drill 3 is being lowered. A so-called spike pin 13 may be also provided in the vicinity of stop 12, this pin sticking into work so as to prevent base 2 from sliding thereon.

Figure 3:
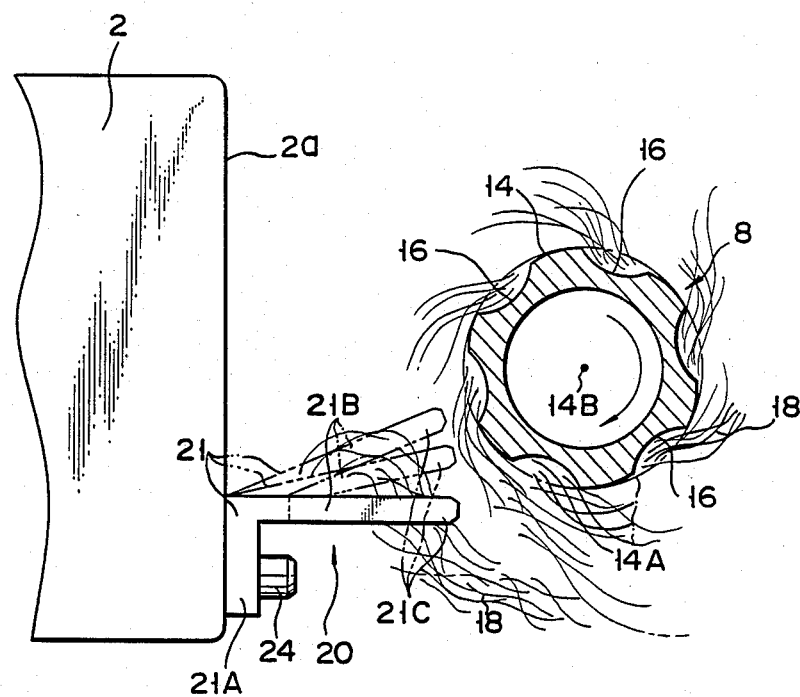
FIG. 3 is a top plan view of the embodiment of the chip breaking device of FIG. 1 and other embodiments thereof, together with an annular cutter.

As shown in FIGS. 2 and 3, annular cutter 8 has a plurality of cutting edges 15 at the lower peripheral edge 14a of hollow cylindrical body 14. The outer periphery 14A (which is an imaginary cylinder formed by adjoining the outermost portions of body 14) of body 14 has a plurality of flutes 16 formed thereon, which are adjacent to the respective cutting edges 15 and extend, in a twisting manner, from lower edge 14a of body 14 to the upper edge thereof. As chips 18 are generated from work 1, each chip is moved upward within that flute 16 which is situated on the right upstream side of the cutting edge 15 which has cut the chip. Cutting edges 15 comprise outer cutting edges and inner cutting edges alternatively arranged in the circumferential direction of lower edge 14a of body 14. In other words, each pair made up of an inner cutting edge and an outer cutting edge form a set, and a plurality of such sets are arranged at regular intervals along lower edge 14a of body 14. As annular cutter 8 rotates, the inner cutting edges cut the inner portion of annular groove 17 in work 1, and the outer cutting edges remove the outer portion thereof, with the result that an ever deeper annular groove 17 is formed in work 1.

Chip breaking device 20 according to this invention is fixed to the front portion of base 2 of the boring machine, so as to face outer periphery 14A of cylindrical body 14 of annular cutter 8, and has a comb-shaped member 21 which comprises vertical elongated stem 21A extending in the axial direction of cylindrical body 14 of annular cutter 8, and at least three elongated chip breaking elements 21B extending perpendicularly from stem 21A to outer periphery 14A of body 14 of annular cutter 8. Tips 21C of chip breaking elements 21B are on the same vertical plane and are located in proximity to the outer periphery 14A of body 14. They are separated from each other in the axial direction of outer periphery 14A of body 14, at a close spacing of, for example, 5 mm, when they are 5 in number and each element 21B has 15 mm in length and 3 mm in thickness, and stem 21A is 55 mm high. In this case, the distance between tips 14C of elements 21B and outer periphery 14A of body 14 is 3 mm, for example. Elements 21B are in a body with stem 21A or fixedly connected thereto at their other ends.

Referring to FIG. 3, stem 21A of the chip breaking device has an L shape in plan view, and the bent portion remote from elements 21B is fixed by bolts 24 to front wall 2a of base 2 such that elements 21B are set substantially tangentially to the downstream side of outer periphery 14A of body 14 of annular cutter 8 with respect to the direction of the rotation thereof. Alternatively, chip breaking elements 21B can be inclined such that the extension thereof intersects axis 14B of body 14, as is shown by a double-dot line in FIG. 3. They may also be set such that they are inclined at an angle between axis 14B of body 14 and the tangent to the downstream side of outer periphery 14A of body 14 as is shown by a triple dot line in FIG. 3.

Figure 4:
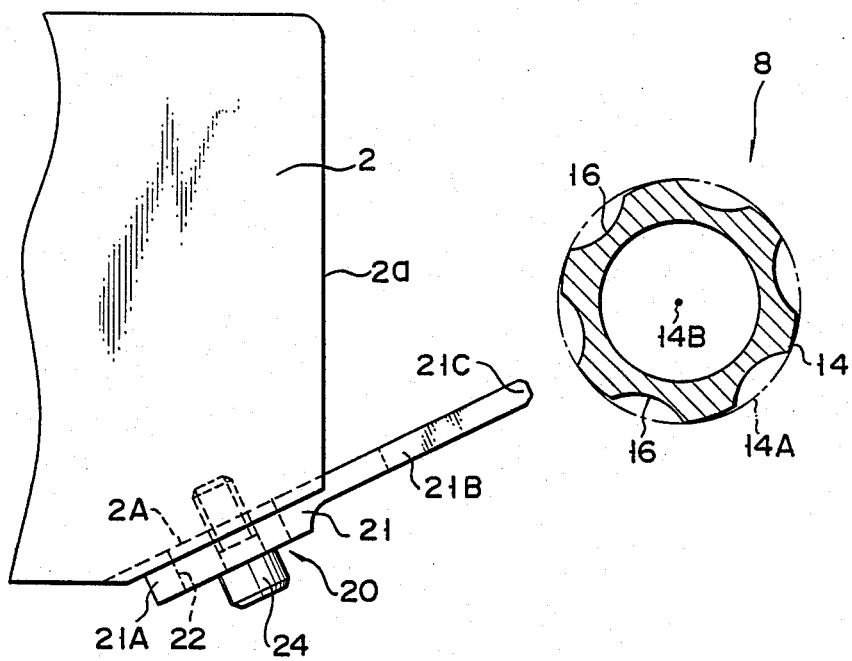
FIG. 4 is a top view of a further embodiment of the chip breaking device according to this invention, together with an annular cutter.

In the embodiment shown in FIG. 4, stem 21A is aligned with elements 21B and has elongated holes 22 extending therealong. The front right corner of base 2 is slanted and is formed with inclined surface 2A, to which stem 21A is fixed by means of bolts 24 which penetrate holes 22 in such a manner that elements are inclined such that the extension thereof intersects axis 8B of body 14. The provision of elongated holes 22 permits the lengthwise adjustment of elements 21B and enables tips 21A of elements 21B to be positioned at a location separated by a suitable distance from outer periphery 14A of body 14.

Figure 5:
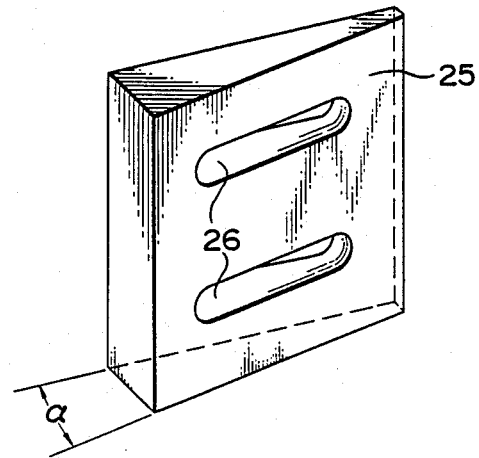
FIG. 5 is a perspective view of an adjusting wedge used in the chip breaking device of FIG. 4.

Adjusting wedge 25, as shown in FIG. 5, can be inserted between inclined surface 2A and stem 21A such that elements 21B are inclined at an angle between axis 14B of body 14 and the tangent to outer periphery 14A of body 14. Wedge angle $\alpha$ is selected to meet this requirement. Wedge 24 has elongated holes 26 coinciding with elongated holes 22.

In operation, the boring machine starts operating, whereby an annular cutter 8 begins forming hole in work 1. As annular cutter 8 cuts deeper into work 1, chips 18 cut from work 1 emerge from flutes 16 and are caused to expand outward by a centrifugal force acting thereon and hit against the upstream faces of chip breaking elements 21B. While cutter 8 is rotating, intermediate portions of the chips thus striking against elements 21B pass through spacings 23 defined between adjacent chip breaking elements 21B, with their tip portions held by the upstream side faces of elements 21B with respect to the direction of rotation of annular cutter 8. In other words, chips 18 are combed by elements 21B and become tangled therewith. Rotating cutter 8 pulls strongly against the chips 18 and tears the same to pieces. Thereafter, most of these pieces fall onto work 1 behind the downstream side faces of elements 21B with respect to the direction of rotation of annular cutter 8. As broken chips 18 pile up there, they are caught by some of the tip portions of chips 18 still wound around body 14 and are rotated by them about rotating body 14. The broken chips 18 again strike against the upstream side face of elements 21B and are moved toward the right lateral side of base 2, beyond cutting area of cutter 8.

With the chip breaking device according to this invention, chips 18 are broken into pieces before they can wrap themselves in many layers around body 14 of cutter 8, or become tightly wound therearound. Thus, chips 18 do not clog up flutes 16 and are smoothly removed from annular groove 17 being cut via flute 16, to the outside thereof.

As long as the chip breaking device of this invention is arranged in the area in which chips 18 are expanded outward by a centrifugal force applied thereto, strike against chip breaking elements 21B and are caught thereby, it is not necessary to readjust the distance between tips 21C of elements 21B and outer periphery 14A of body 14, even if the cutter 8 which has been used is replaced by another annular cutter which has a different diameter. Thus, this chip breaking device can be used for breaking chips produced by a plurality of annular cutters 8 having different diameters, without the need to change its position with respect to the respective annular cutters 8. In this case, the chip breaking device must then be set at a position whereby tips 21C of elements 21B are separated a suitable distance from outer periphery 14A of body 14 of the annular cutter having the largest diameter, in order to avoid contact with or a collision therebetween.

Comb-shaped member 21 is normally made of a hard metal such as steel or cast iron. However, its material is not limited to a metal, and any suitably hard material can be used instead.

The number, thickness, and spacing 23 of chip breaking elements 21B are selected according to the cutting conditions, such as the cutting efficiency of annular cutter 8, the thickness and width of chips 18 produced, and the cutting speed. However, these factors (specifically, spacings 2B) do not have to be determined in a very strict fashion, but should be selected such that it can be ensured that a large amount of broken chips do not pile up around chip breaking elements 21B and that the combing and chip breaking actions can be performed smoothly.

I claim:

1. A chip breaking device for annular cutters each including a hollow cylindrical body having an outer periphery and an axis, said device being fixed to a boring machine, comprising:
   a stem extending parallel with said outer periphery; and
   at least three elongated chip breaking elements adapted to break chips around said annular cutter and extending parallel with each other and perpendicularly form said stem into proximity to said outer periphery, adjaacent ones of said chip breaking elements being separated axially of said body, at a spacing, each of said chip breaking elements having a tip, the tips of all of said chip breaking elements being disposed on a plane parallel with said outer periphery.

2. The device according to claim 1, wherein said stem and said chip breaking elements are formed as a single body.

3. The device according to claim 1, wherein said chip breaking elements are directed to said axis of said hollow cylindrical member.

4. The device according to claim 1, wherein said chip breaking elements are directed tangentially to the upstream side of said outer periphery with respect to the direction of rotation of said cutter.

5. The device according to claim 1, wherein said chip breaking elements are inclined at an angle between said axis and a tangent to the upperstream side of said outer periphery with respect to the direction of rotation of said cutter.

6. The device according to claim 1, further comprising an adjusting wedge provided between said stem and said boring machine, for adjusting the direction of said chip breaking elements.

7. The device according to claim 1, wherein said device is adjustable along said chip breaking elements.

* * * * *

UNITED STATES PATENT AND TRADEMARK OFFICE
CERTIFICATE OF CORRECTION

PATENT NO. : 4,824,299

DATED : April 25, 1989

INVENTOR(S) : Shoji et al

It is certified that error appears in the above-identified patent and that said Letters Patent is hereby corrected as shown below:

First page, column 1, delete [30] Foreign Application Priority Data
Sep. 24, 1987 [JP]  Japan ................................62-145770".

Signed and Sealed this

Sixth Day of March, 1990

*Attest:*

JEFFREY M. SAMUELS

*Attesting Officer*     *Acting Commissioner of Patents and Trademarks*